United States Patent [19]

Ishida et al.

[11] Patent Number: 4,607,908
[45] Date of Patent: Aug. 26, 1986

[54] OPTICAL DEFLECTOR

[75] Inventors: Takao Ishida, Kawasaki; Yoshitsugu Nakatomi, Yokohama, both of Japan

[73] Assignee: Kabushiki Kaisha Toshiba, Kawasaki, Japan

[21] Appl. No.: 735,984

[22] Filed: May 20, 1985

[30] Foreign Application Priority Data

May 21, 1984 [JP] Japan .................. 59-102030

[51] Int. Cl.⁴ ............................. G02B 26/10
[52] U.S. Cl. .................................. 350/6.8
[58] Field of Search ............ 350/6.5, 6.8, 6.7, 6.1

[56] References Cited

U.S. PATENT DOCUMENTS 4,443,043  4/1984  Yamaguchi ............... 350/6.5
4,523,800  6/1985  Yamashita et al. ........ 350/6.7

Primary Examiner—John K. Corbin
Assistant Examiner—Loha Ben
Attorney, Agent, or Firm—Schwartz, Jeffery, Schwaab, Mack, Blumenthal & Evans

[57] ABSTRACT

In an optical deflector of a polygonal mirror type, a rotating shaft is supported by a pair of journal bearings of a herringbone dynamic pressure type and a magnetic thrust bearing. The magnetic thrust bearing comprises first and second annular magnets. The first annular magnet is coaxially fixed to the shaft and has a first magnetic pole arrangement on its outer surface. The second annular magnet is fixed to a housing, and has its inner surface opposed to the outer surface of the first magnet and magnetized with a pole arrangement different from the pole arrangement of the first magnet, so that the first and second magnet attract one another to suspend the shaft. Ferromagnetic plates are fixed on both upper and lower surfaces of the first and second magnets.

10 Claims, 5 Drawing Figures

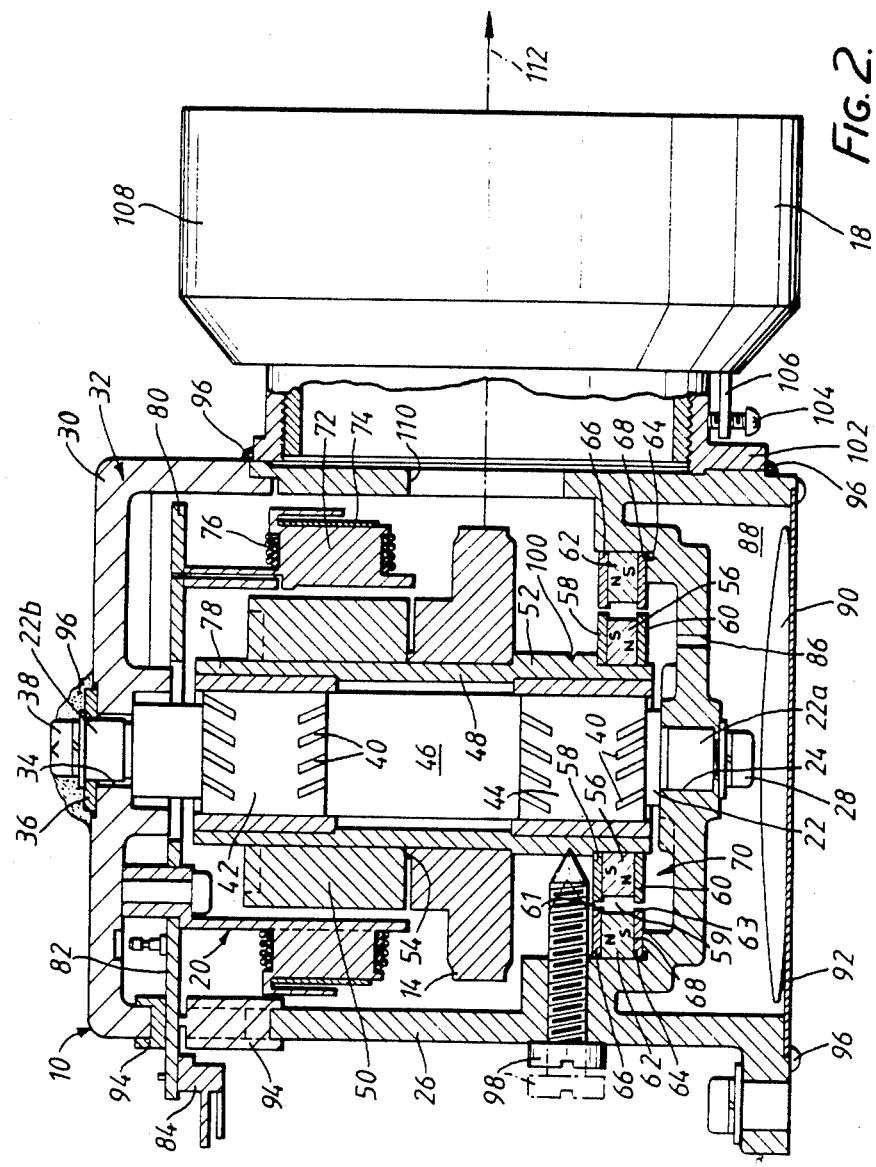

OPTICAL DEFLECTOR

BACKGROUND OF THE INVENTION

This invention relates to an optical deflector used for a laser beam printer.

In general, an optical deflector is provided with a motor to rotate a polygonal mirror for deflecting a laser beam emitted by a semiconductor laser diode. In such a motor, friction between a motor shaft and bearings needs be minimized for high speed rotation. To meet this requirement, the motor shaft is radially supported by journal bearings of a dynamic pressure type, and is floated or suspended to be axially supported by an attractive magnetic force produced between permanent magnets fixed individually to an end of the motor shaft and a motor housing. Such an arrangement is disclosed in U.S. Pat. No. 4,443,043 to Yamaguchi.

In the motor mentioned above, air is introduced into a gap of 3 $\mu$m to 6 $\mu$m between the bearing members of dynamic journal bearings of herringbone type through herringbone grooves. As a result, a bearing pressure within the gap is increased at the center portion of the bearings, so that the motor shaft is subjected to a radial force. The motor shaft is suspended in a position in which the thrust load and the attractive magnetic force produced between the permanent magnets are balanced. This rotary mechanism with axial bearings and thrust bearings permits the motor to rotate at a high speed, i.e., in the range of 4,000 rpm to 15,000 rpm.

For producing the attractive magnetic force strong enough to balance with the thrust load, however, the number of magnets must be increased and the gap between the magnets must be reduced. Reduction of the gap is restricted by the limit to which the magnets can be machined. Also, the unevenness of the radial attractive magnetic force causes the rotation of the motor shaft to become irregular. As a result, the scanning position of a laser scanned by the polygonal mirror varies.

SUMMARY OF THE INVENTION

Accordingly, it is an object of the present invention to provide an optical deflector capable of stably deflecting a light beam for a long period.

Another object of the present invention is to provide an optical deflector which is inexpensive and easy to assemble.

These and other objects are achieved by providing a novel optical deflector with a polygonal mirror for deflecting a light beam, the optical deflector including shaft means for supporting and rotating the polygonal mirror so that a light beam reflected by the polygonal mirror is deflected within a certain spread angle, bearing means for rotatably supporting the shaft means, first magnet means with a first magnetic pole arrangement, fixed to the shaft means, for producing magnetic force, second magnet means with a second magnetic pole arrangement different from the first magnetic pole arrangement, disposed coaxially with the first magnet means, and opposed to the first magnet means across a gap, for axially suspending the shaft means by means of the magnetic force produced between the first magnet means and second magnet means, and ferromagnetic means, fixed on the first and second magnet means, respectively, for preventing the magnetic lines of force produced between the first and second magnet means from diverging.

BRIEF DESCRIPTION OF THE DRAWINGS

These and other objects and advantages of the invention will become more apparent and more readily appreciated from the following detailed description of the preferred embodiments of the invention taken in conjunction with the accompanying drawings, of which:

FIG. 2 is a sectional view of the optical deflector;

DETAILED DESCRIPTION OF THE PREFERRED EMBODIMENTS

Figure 1:
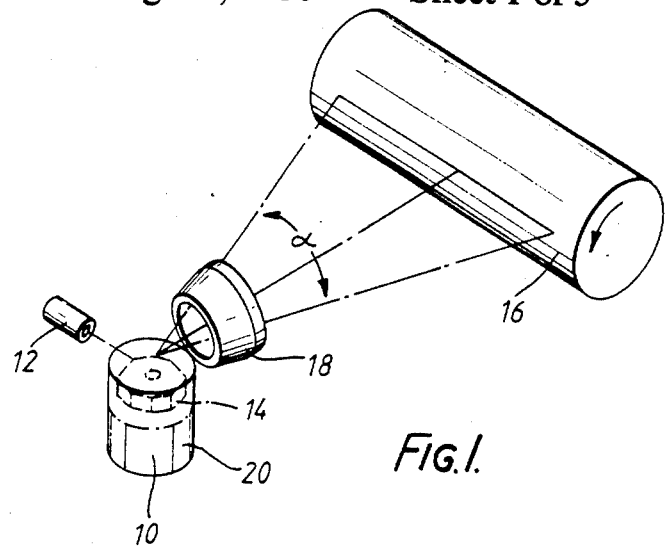
FIG. 1 is a schematic view of a laser beam printer including an optical deflector of a polygonal mirror type according to the present invention.

FIG. 1 is a schematic view of a laser beam printer including an optical deflector 10 incorporating the present invention.

Referring to FIG. 1, a laser beam modulated in intensity by image information is emitted by a laser unit 12, such as a semiconductor laser diode, to optical deflector 10. Optical deflector 10 is provided with a polygonal mirror 14 having, for example, eight light reflecting surfaces. This polygonal mirror 14 is rotated rapidly, so that the laser beam reflected by the light reflecting surfaces of mirror 14 is deflected within a certain spread angle $\alpha$. The deflected laser beam is directed to an electrophotographic photosensitive drum 16 through a lens 18. Thus, drum 16 is scanned with the laser beam and a latent image is formed on drum 16. Lens 18 compensates the focal plane of the laser beam deflected by polygonal mirror 14, so that the focused laser beam generates a plane in the direction of scanning.

Referring to FIG. 2, optical deflector 10 is provided with a motor 20 for rotating polygonal mirror 14 in a high speed to a predetermined direction, for example, clockwise in a plan view. A lower end 22a of a fixed shaft 22 is secured in a fixing portion 24 of a lower housing 26 by means of a screw 28. Lower housing 26 takes the shape of a cylinder with a bottom plate and is made of nonmagnetic material. An upper housing 30 is fast with lower housing 26 so as to close the upper opening of housing 26 and composes a container 32 together with lower housing 26. An upper end 22b of fixed shaft 22 is inlaid loosely in an opening 34 of housing 30. Upper end 22b is also fitted into a plate 36 fixed on the top surface of upper housing 30. The top surface of plate 36 is slightly higher than the top surface of upper housing 30. Upper end 22b of fixed shaft 22 is fixed to upper housing 30 by means of plate 36 and a screw 38.

Fixed shaft 22 is formed with herringbone grooves 40 on the peripheral surfaces of the upper and bottom portions of shaft 22. The direction of inclined grooves 40 is directed to the direction of the rotation of polygonal mirror 14 to form journal bearings 42 and 44 of a dynamic pressure type.

Fixed shaft 22 includes small diameter portions of upper and lower ends 22a and 22b, and a large diameter portion of a columnar portion 46 where grooves 40 are formed. A hollow cylinder 48 is rotatably fitted on fixed shaft 22. This cylinder 48 is overlapped on portion 46 with a gap of 3 $\mu$m to 6 $\mu$m between the inner surface of cylinder 48 and the outer surface of portion 46 of shaft 22.

Polygonal mirror 14 is fitted by means of shrinking or pressing-in to cylinder 48, so that the lower inner periphery of polygonal mirror 14 abuts against an upper shoulder of a projecting collar 52 provided at the slightly lower position from the vertical center of cylinder 48. A motor rotor 50 is also fitted on cylinder 48 so that it abuts against a rib 54 provided at the upper surface of polygonal mirror 14. An inner magnetic ring 56 is secured on cylinder 48. This ring 56 is composed of an annular permanent magnet having an inner peripheral surface coaxially fixed to cylinder 48 and an outer peripheral surface provided with magnetic poles. As shown in FIG. 2, the outer peripheral surface of ring 56 is magnetized with south and north poles, in this order from the top. Also, ring 56 is put between annular plates 58 and 60 made of ferromagnetic material such as iron plates. Namely, plate 58 is fixed on the upper surface of ring 56, and plate 60 is fixed on the bottom surface of ring 56. The outer peripheral surfaces of plates 58 and 60 is projected from the outer peripheral surface of ring 56 as shown in FIG. 2.

An outer magnetic ring 62 is securely fitted to a stepped recess 64 provided on the bottom plate of lower housing 26. This ring 62 is composed of an annular permanent magnet having an inner peripheral surface coaxially opposed to the outer peripheral surface of ring 56 across a first annular gap 59 and an outer peripheral surface fixed to recess 64. As shown in FIG. 2, the inner peripheral surface of ring 62 is magnetized with north and south poles in that order from the top. This is the opposite of the arrangement of the poles on the outer peripheral surface of ring 56. Thus, an attractive magnetic force is produced between rings 56 and 62. Also, ring 62 is put between annular plates 66 and 68 made of ferromagnetic material such as iron plates. Namely, plates 66 and 68 are fixed on the upper and bottom surfaces of ring 62, respectively. The inner peripheral surfaces of plates 66 and 68 project from the inner peripheral surface of ring 62, as shown in FIG. 2. Annular plates 66 and 58 thus define a second annular gap 61 which is narrower than first annular gap 59. Annular plates 60 and 68 define therebetween a third annular gap 63 substantially the same width as second annular gap 61.

Rings 56 and 62 and plates 58, 60, 66 and 68 constitute a magnetic thrust bearing 70 which supports cylinder 48 conjoining polygonal mirror 14 and rotor 50.

A motor stator 72 is installed on upper housing 30 so as to surround motor rotor 50 in a circle. This motor stator 72 is provided with a yoke 74 and a driving coil 76 wound about yoke 74. Motor stator 72 is so designed as to produce a magnetic field which may drive a rotor assembly 78 comprising cylinder 48, motor rotor 50 and polygonal mirror 14. Further, motor stator 72 is provided with a driving circuit board 80 which is electrically connected to driving coil 76. The surface of driving coil 76 and circuit board 80 is covered with insulating varnish film, which may prevent the ingress of foreign materials such as peeled-off dust from the film coated on coil 76 and of flux dust and chips from circuit board 80. The material forming the insulating varnish film should be butadien or urethane varnish (such as NISSO-PB available from NIPPON SODA, Inc.) which does not produce gases in a dry atmosphere.

As shown in FIG. 2, circuit board 80 has a projection 82 projecting out of container 32. A connector 84 is attached at the end of projecting portion 82. The above-mentioned construction, therefore, allows secure and easy connecting without faulty connection and disconnection as compared with conventional types in which a driving circuit is connected to lead wires and the lead wires are led out of container 32.

The bottom plate of lower housing 26 has a hole 86 opening to a space 88, in which a desiccating agent 90 is stored. Space 88 is tightly enclosed by a plate 92.

The upper opening of upper housing 30 is tightly enclosed by an elastic seal member 94 of rubber or the like. Motor housings 26 and 30 are sealed up with a silicone compound member 96 or other sealing member to make vessel 32 completely airtight. Thus, polygonal mirror 14 and motor 20 are enclosed within tightly sealed vessel 32, which is filled with clean air. As cylinder 48 rotates at high speed, the inside of vessel 32 must be filled with clean air free from any dust, dirt and moisture. This enclosed construction may prevent the ingress of dust, dirt and moisture, and it also keeps the air in vessel 32 fairly completely dry, so that locking of motor 20, corrosion of polygonal mirror 14, and rusting of other portions are prevented.

A screw 98 is provided through the side wall of housing 26 so as to fix rotor assembly 78. By the insertion of a tapered tip of screw 98 into a groove 100 provided on the periphery of cylinder 48, rotor assembly 78 is restricted from making unnecessary motion during transmission.

As shown in FIG. 2, lens 18 is installed on a flange 102 of housing 26. Lens unit 18 may be rotated as desired by adjusting a screw 104 fitted to a stay 106 projecting from a case 108 of lens unit 18. This construction permits lens unit 18 to be moved in such a direction as to bring lens unit 18 closer to or farther from polygonal mirror 14. Deflection of the focusing point due to an uneven refractive index of the glass material which forms lens 18 may be corrected by changing the distance between lens 18 and drum 16. The reflected light beam is led to an image forming surface of drum 16 through lens unit 18 and a transmission hole section 110 and along an optical axis 112 as shown in FIG. 2.

Figure 3:
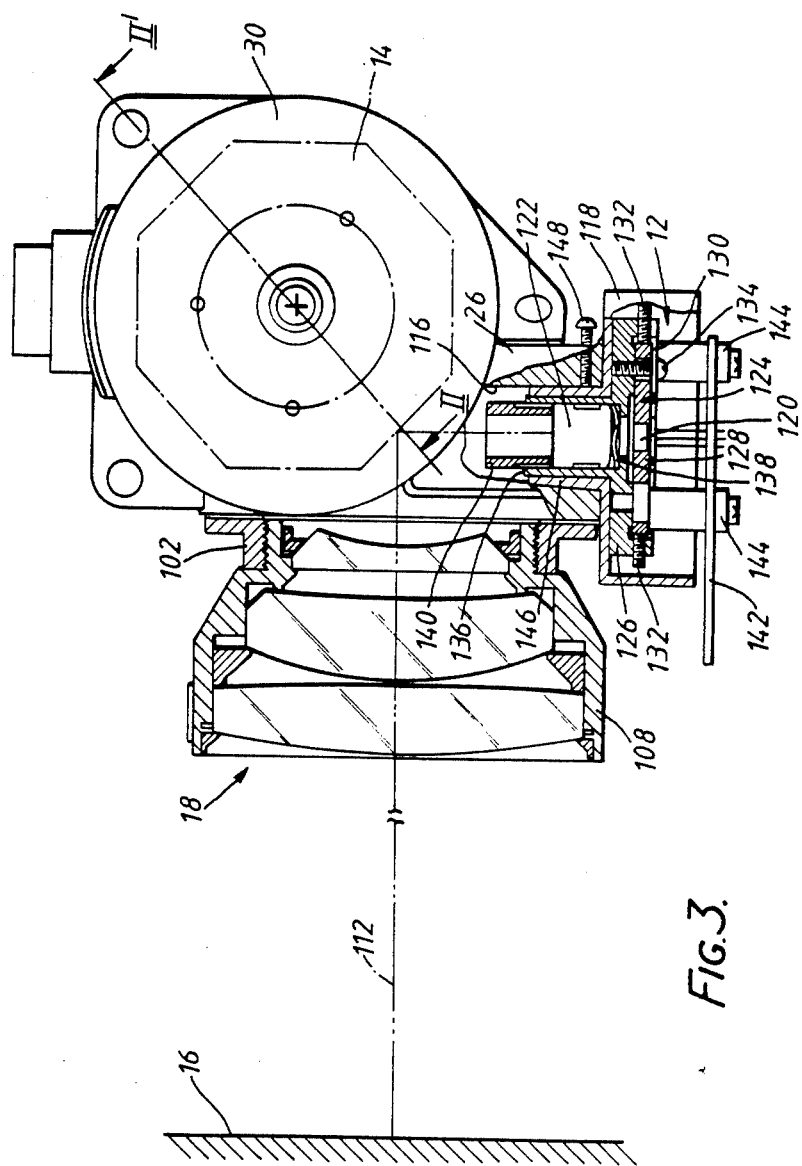
FIG. 3 is a plan view of the optical deflector.

Referring to FIG. 3, laser unit 12 is fixed on motor housing 26. This unit 12 is opposed to the reflecting surface of polygonal mirror 14 through a hole 116 provided at the side wall of motor housing 26, and is enclosed with a protective cover 118 made of insulating material. Thus, the laser beam emitted from laser unit 12 is led to polygonal mirror 14 and is reflected by mirror 14. Laser unit 12 comprises a semiconductor laser diode 120 and a collimator lens 122. Semiconductor laser diode 120 is fitted on a disk-shaped holder 124 which contacts a lens holder 126 with a smooth surface 128. The outer diameter of holder 124 is smaller than the inner diameter of a recess 130 provided on lens holder 126. Disk holder 124 may be moved on the surface of recess 130 by adjusting four screws 132 (two of these being visible in FIG. 3), and is finally fixed with a screw 134 after the axis of the laser beam emitted from semiconductor laser diode 120 is made to coincide with the optical axis of lens 122.

Collimator lens 122 is inserted into a hollow cylinder 136 of lens holder 126, and is pressed against a ring-shaped spring 138 placed at the bottom of cylinder 136 by a cylindrical screw 140. This screw 140 is screwed in along threads provided on the inner surface of hollow cylinder 136 of lens holder 126 to allow adjustment of the distance between semiconductor laser diode 120 and collimator lens 122.

Laser diode 120 is electrically connected to a circuit board 142 supported by studs 144 attached to laser holder 124. Circuit board 142 is provided with printed circuits for driving and modulating laser diode 120.

Protective cover 118 of laser unit 12 is fixed in hole 116 of motor housing 26 by inserting a cylindrical portion 146. Hollow cylinder 136 of lens holder 126, which is inserted into cylindrical portion 146 of protective cover 118, is movable around the axis of cylindrical portion 146. Laser unit 12 may be fixed at any position by pressing the outer periphery of cylindrical portion 146 of cover 118 by means of a set screw 148. This screw 148 is strongly pressed on cover 118 to bend cylindrical portion 146. As a result, laser unit 12 may be fixed without directly contacting with any conductive members, that is, can remain insulated from motor housing 26. As the outer surface of laser unit 12 is covered with cover 118 of insulating material, semiconductor laser diode 120, which is liable to be damaged by a minute current from outside, is securely protected.

Semiconductor laser diode 120 may be turned around the optical axis of the laser beam according to the rotation of hollow cylindrical portion 146 of cover 118. Therefore, the beam spot of the laser beam may be adjusted in accordance with the rotation of laser diode 120.

When the diameter of the beam spot is different from a specified value, favorable image density may not be obtained due to the occurrence of spreading and overlapping of the scanning line intervals. In the present invention, however, correction of the length of the elliptical beam spot in the direction of the subscanning may be achieved by rotation of laser unit 12, so that a favorable image density and a distinct image may be obtained.

In the optical deflector of a polygonal mirror type described above, when electric power is supplied to motor drive coil 76 of stator 72, a rotating magnetic field is established in stator 72 to drive rotor assembly 78 clockwise. The rotation of rotor assembly 78 introduces an air flow into the gap between the fixed shaft 22 and cylinder 48 by the operation of herringbone grooves 40. The air flow produces a radial air pressure and forms air dynamic journal bearings 42 and 44 on portion 46. Thus, the pressure inside the infinitesimal gaps, especially the pressure at the regions over the central portions of bearings 42 and 44, is increased, so that cylinder 48 is subjected to a radial force and supported by the pressure inside gaps.

In magnetic thrust bearing 70, inner and outer magnetic rings 56 and 62 attract one another. Namely, the south and north poles on the outer surface of inner magnet ring 56 attract the north and south poles on the inner surface of outer magnet ring 62, respectively. Thus, inner magnet ring 56 is located at a balanced position which depends on the attraction between magnet rings 56 and 62 and the weight of rotor assembly 78, so that cylinder 48 is kept suspended.

Figure 4A:
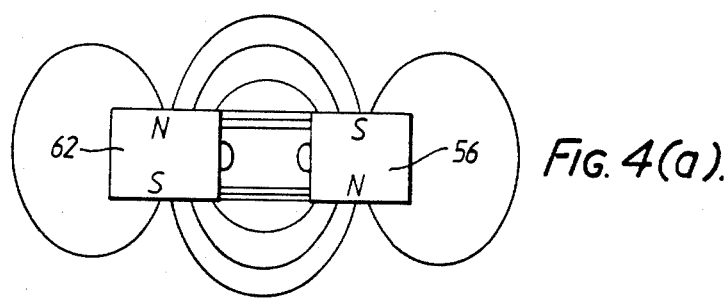
FIGS. 4 and 5 are explanatory drawings showing the operation of a bearing of the optical deflector.

FIG. 4(a) shows the state of magnetic flux of magnetic rings 56 and 62 in the case where annular plates 58, 60, 66 and 68 are not provided on the upper and lower sides of rings 56 and 62. As shown in FIG. 4(a), attractive magnetic rings 56 and 62, and externally diverging magnetic lines of force are also formed from rings 56 and 62.

Figure 4B:
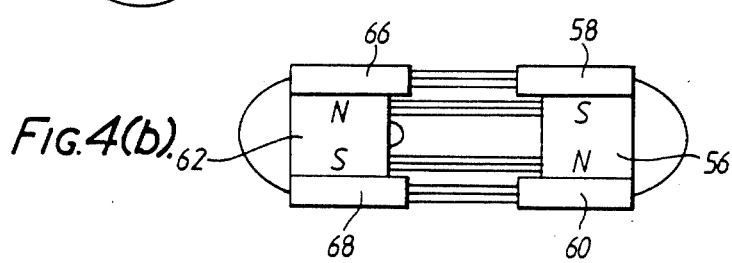

On the other hand, FIG. 4(b) shows the state of magnetic flux of magnetic rings 56 and 62 which have annular plates 58, 60, 66 and 68 on the upper and lower sides of rings 56 and 62, respectively. The magnetic flux is increased over that of the case of FIG. 4(a), and the attractive force between rings 56 and 62 is concommitantly increased.

Figure 5A:
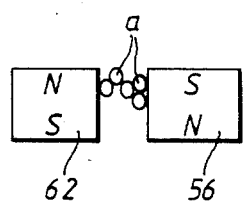
Figure 5B:
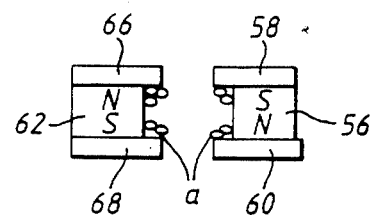

The placement of annular plates 58, 60, 66, and 68 on rings 56 and 62, respectively, results in many advantages. In the normal operation of prior art devices, depicted in FIG. 5(a), the gap between the magnetic rings is uniformly narrow. Magnetic particles, designated "a" in FIGS. 5(a) and 5(b), have a tendency to accumulate on the opposing ring faces, thus bridging the gap formed therebetween and contributing to accelerated abrasion and wear. In a device according to the present invention, on the other hand, the magnetic rings need not be so close together for the same field strength. Thus, the gap between magnets is larger and less easy to bridge. This is depicted in FIG. 5(b).

Also, the provision of plates 58, 60, 66, and 68 makes it possible to achieve adequate field strengths with weaker and less expensive magnetic materials. The total number of magnets may also be reduced.

The plates further even out and promote regularity in the resultant magnetic field. This in turn promotes smooth rotation of the shaft, which is crucial in optical deflector applications.

The larger gap sizes permitted by the invention also lead to a reduction in the oscillation of the attractive forces caused by axial vibration of the rotor.

Finally, the use of nonmagnetic members for fitting the magnetic rings 56 and 62 makes for more effective and efficient use of the developed magnetic flux.

Therefore, rotor assembly 78 is contactlessly supported against fixed shaft 22, and stable high speed rotation of assembly 78 is assured.

Thus, polygonal mirror 14 rotates in the high speed and deflects the laser beam emitted from laser unit 12. The deflected laser beam is led to the surface of photosensitive drum 16 through hole 110 and lens 18, and scanned.

Obviously, many modifications and variations of the present invention are possible in the light of above teachings. It is, therefore, to be understood that within the scope of the appended claims, the invention may be practiced otherwise than as specifically described.

What is claimed is:

1. An optical deflector with a polygonal mirror for deflecting a light beam comprising:

shaft means for supporting and rotating the polygonal mirror so that a light beam reflected by the polygonal mirror is deflected within a certain spread angle;

bearing means for rotatably supporting said shaft means;

first magnet means with a first magnetic pole arrangement, fixed to said shaft means, for producing magnetic force;

second magnet means with a second magnetic pole arrangement different from said first magnetic pole arrangement, disposed coaxially with said first magnet means and opposed to said first magnet means across a gap, for axially suspending said shaft means by means of the magnetic force produced between said first magnet means and second magnet means; and ferromagnetic means fixed on said first and second magnet means, respectively, for preventing magnetic lines of force produced between said first and second magnet means from diverging.

2. An optical deflector according to claim 1, wherein said ferromagnetic means includes an iron plate.

3. An optical deflector with a polygonal mirror for deflecting a light beam comprising:
cylindrical shaft means for supporting and rotating the polygonal mirror therewith so that a light beam reflected by the polygonal mirror is deflected within a certain spread angle;
bearing means for rotatably supporting said shaft means;
a first annular magnet member with its inner peripheral surface coaxially fixed to said shaft means and having a first magnetic pole arrangement on its outer peripheral surface;
a second annular magnet member with its inner peripheral surface coaxially opposed to the outer peripheral surface of said first annular magnet member across a first gap, having on the inner peripheral surface a second magnetic pole arrangement different from the first magnetic pole arrangement for producing a magnetic force to suspend said shaft means in the radial direction of said shaft means cooperating with said first annular magnet member;
a first ferromagnetic member fixed on said first annular magnetic member; and
a second ferromagnetic member, fixed on said second annular magnetic member and opposed to said first ferromagnetic member across a second gap, for preventing magnetic lines of force produced between said first and second annular magnet members from diverging, by coacting with said first ferromagnetic member.

4. An optical deflector according to claim 3, wherein the first gap defined between said first and second annular magnet members is wider than the second gap defined between said first and second ferromagnetic members.

5. An optical deflector according to claim 3, further comprising housing means for covering said shaft means, said bearings means and said first and second annular magnet members.

6. An optical deflector according to claim 5, wherein an outer peripheral surface of said second annular magnet member is fixed to said housing means.

7. An optical deflector according to claim 6, wherein said shaft means and said housing means are made of nonmagnetic material.

8. An optical deflector according to claim 3, further comprising:
a rotor fixed to said shaft means; and
a stator, disposed coaxially with said rotor, for rotating said shaft means cooperating with said rotor.

9. An optical deflector with a polygonal mirror for deflecting a light beam comprising:
a housing;
a fixed shaft fixed to said housing and having two end portions;
a cylindrical shaft, rotatably and coaxially overlapped on said fixed shaft in said housing, for supporting and rotating the polygonal mirror so that a light beam reflected by the polygonal mirror is deflected within a certain spread angle;
a pair of bearings, fixed to both end portions of said fixed shaft, for rotatably supporting said cylindrical shaft;
a first magnet member with a first magnetic pole arrangement, fixed to said cylindrical shaft;
a second magnet member with a second magnetic pole arrangement different from said first magnetic pole arrangement, fixed to said housing and opposed to said first magnet member across a gap, for axially suspending said cylindrical shaft by means of magnetic attractive force produced between said first and second magnet members;
a first ferromagnetic member fixed on said first magnetic member; and
a second ferromagnetic member, fixed on said second magnetic member, for preventing magnetic lines of force produced between said first and second magnet members from diverging, cooperating with said first ferromagnetic member.

10. A magnetic thrust bearing for supporting a rotating shaft noncontiguously with a support member comprising:
first annular magnetic means for producing a magnetic field, said first annular magnetic means being coaxial with and fixed to a first portion of said rotating shaft to rotate therewith, and having a first magnetic pole pattern on a radially outer face thereof;
second annular magnetic means for creating a magnetic field, said second annular magnetic means being coaxial with said rotating shaft, fixed to said support member so as not to rotate with said rotating shaft, and having a radially inner face disposed laterally adjacent but not touching said radially outer face, thereby defining a first annular gap with said radially outer face, and having a second magnetic pole pattern on said radially inner face, said second magnetic pole pattern being polewise inverted with respect to the said first magnetic pole pattern so that said first and second annular magnetic means attract one another;
a first pair of annular ferromagnetic plates, arranged coaxially with said shaft, respectively axially abutting axial ends of said first magnetic means; and
a second pair of annular ferromagnetic plates, arranged coaxially with said shaft, respectively axially abutting axial ends of said second magnetic means, and defining a pair of second annular gaps with said first pair of first annular ferromagnetic rings, said second annular gap being narrower than said first annular gap; whereby lines of magnetic force developed between said first and second magnetic means are contained by said ferromagnetic plates and not permitted to diverge.

* * * * *